United States Patent
Brown et al.

(10) Patent No.: US 9,477,476 B2
(45) Date of Patent: Oct. 25, 2016

(54) FUSING IMMEDIATE VALUE, WRITE-BASED INSTRUCTIONS IN INSTRUCTION PROCESSING CIRCUITS, AND RELATED PROCESSOR SYSTEMS, METHODS, AND COMPUTER-READABLE MEDIA

(71) Applicant: QUALCOMM Incorporated, San Diego, CA (US)

(72) Inventors: Melinda J. Brown, Raleigh, NC (US); Michael William Morrow, Wilkes-Barre, PA (US); James Norris Dieffenderfer, Apex, NC (US); Brian Michael Stempel, Raleigh, NC (US); Michael Scott McIlvaine, Raleigh, NC (US); Rodney Wayne Smith, Raleigh, NC (US); Jeffrey M. Schottmiller, Raleigh, NC (US); Andrew S. Irwin, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 13/686,229

(22) Filed: Nov. 27, 2012

(65) Prior Publication Data
US 2014/0149722 A1    May 29, 2014

(51) Int. Cl.
*G06F 9/00* (2006.01)
*G06F 9/44* (2006.01)
*G06F 9/30* (2006.01)

(52) U.S. Cl.
CPC ......... *G06F 9/3017* (2013.01); *G06F 9/30167* (2013.01)

(58) Field of Classification Search
None
See application file for complete search history.

(56) References Cited

U.S. PATENT DOCUMENTS 5,751,984 A * 5/1998 Chang ................... G06F 9/3853
712/216
6,675,376 B2   1/2004 Ronen et al.
(Continued)

FOREIGN PATENT DOCUMENTS

| EP | 0899656 A2 | 3/1999 |
| EP | 1003094 A2 | 5/2000 |
| WO | 2012151331 A1 | 11/2012 |

OTHER PUBLICATIONS

Hu et al., "Using Dynamic Binary Translation to Fuse Dependent Instructions," Proceedings of the International Symposium on Code Generation and Optimization (CGO 2004), Computer Society, 0-7695-2102-9/04 2004 IEEE.

(Continued)

*Primary Examiner* — Michael Sun
(74) *Attorney, Agent, or Firm* — Peter Michael Kamarchik; Kenneth Vu

(57) ABSTRACT

Fusing immediate value, write-based instructions in instruction processing circuits, and related processor systems, methods, and computer-readable media are disclosed. In one embodiment, a first instruction indicating an operation writing an immediate value to a register is detected by an instruction processing circuit. The circuit also detects at least one subsequent instruction indicating an operation that overwrites at least one first portion of the register while maintaining a value of a second portion of the register. The at least one subsequent instruction is converted (or replaced) with a fused instruction(s), which indicates an operation writing the at least one first portion and the second portion of the register. In this manner, conversion of multiple instructions for generating a constant into the fused instruction(s) removes the potential for a read-after-write hazard and associated consequences caused by dependencies between certain instructions, while reducing a number of clock cycles required to process the instructions.

25 Claims, 12 Drawing Sheets

(56) References Cited

U.S. PATENT DOCUMENTS

| | | | |
|---|---|---|---|
| 6,732,257 B1 | 5/2004 | Sheaffer | |
| 7,458,069 B2* | 11/2008 | Ronen | G06F 9/3001 712/E9.017 |
| 7,555,631 B2* | 6/2009 | Garg | G06F 9/30029 712/228 |
| 7,681,019 B1 | 3/2010 | Favor | |
| 7,818,550 B2* | 10/2010 | Vaden | 712/226 |
| 2005/0177707 A1 | 8/2005 | Banerjee et al. | |
| 2010/0299505 A1* | 11/2010 | Uesugi | G06F 9/3893 712/221 |
| 2011/0264897 A1* | 10/2011 | Henry | G06F 9/30007 712/226 |
| 2013/0311754 A1* | 11/2013 | Brown | G06F 9/3867 712/216 |

OTHER PUBLICATIONS

International Search Report and Written Opinion—PCT/US2013/072035—ISA/EPO—Feb. 4, 2014.

Friendly, D.H., et al., "Putting the Fill Unit to Work: Dynamic Optimizations for Trace Cache Microprocessors," MICRO 31 Proceedings of the 31st annual ACM/IEEE international symposium on Microarchitecture, IEEE Computer Society Press, 1998, pp. 173-181.

Friendly, D.H., et al., "Putting the Fill Unit to Work: Dynamic Optimizations for Trace Cache Microprocessors," MICRO 31 Proceedings of the 31st annual ACM/IEEE international symposium on Microarchitecture, IEEE Computer Society Press, 1998, pp. 173-181; 31st International Symposium on Microarchitecture Dallas, TX, USA—Nov. 30-Dec. 2, 1998.

* cited by examiner

FUSING IMMEDIATE VALUE, WRITE-BASED INSTRUCTIONS IN INSTRUCTION PROCESSING CIRCUITS, AND RELATED PROCESSOR SYSTEMS, METHODS, AND COMPUTER-READABLE MEDIA

BACKGROUND

I. Field of the Disclosure

The technology of the disclosure relates generally to processing of pipelined computer instructions in central processing unit (CPU)-based systems.

II. Background

The central processing unit (CPU) of virtually every digital computer includes a small number of storage areas known as registers. Each register can provide local storage for a variety of data. Examples include operands to be manipulated by the CPU, memory addresses to be accessed by the CPU, and results of calculations that are performed by the CPU. Because the registers are physically located within the CPU itself, the CPU can store data in the registers and retrieve data from the registers much more quickly than the CPU can access cache memory or the computer's main memory.

The advent of "instruction pipelining" in modern computer architectures has made complex use of computer registers. Instruction pipelining is a processing technique whereby a throughput of computer instructions being processed by a CPU may be increased by splitting the processing of each instruction into a series of steps. The instructions are executed in a "processor pipeline" composed of multiple stages, with each stage carrying out one of the steps for each of a series of instructions. As a result, in each CPU clock cycle, various steps of the multiple instructions can be evaluated in parallel, resulting in improved utilization of CPU resources and faster execution times of computer applications.

However, the use of instruction pipelining may introduce unexpected consequences if dependencies exist between one or more instructions. For example, a first instruction in a processing pipeline may not be guaranteed to complete execution before a subsequent instruction begins execution. If the subsequent instruction depends on a result of the execution of the first instruction, a condition known as a "read-after-write hazard" may arise. To resolve the read-after-write hazard, the CPU may "stall" the pipeline (i.e., introduce an intentional delay into the pipeline to allow the first instruction to complete execution).

One particular instance in which the possibility of a read-after-write hazard may arise is during generation of constant values for storage in a register. A constant value may be generated through the use of an instruction in conjunction with an "immediate value" (i.e., a value that is encoded directly in the instruction and that is used as numeric data when the instruction is executed) to write the immediate value into the register. The limitations of a computer's architecture may impose restrictions on the size of an immediate value that can be moved to a register using a single instruction. Because some bits of the single instruction are used for data such as the instruction type and the register to which the immediate value is to be written, an immediate value must be smaller than the size of the instructions in the computer's instruction set. Consequently, generation of a 32-bit constant using a 32-bit instruction set, for instance, may entail the execution of at least two separate instructions. Because the subsequent instruction(s) are dependent upon the execution of the preceding instruction(s), a read-after-write hazard may be encountered with the associated risks of stalling the pipeline in which the instructions are executing. Moreover, while other techniques exist for mitigating the chance of a read-after-write hazard (such as allowing an instruction to overwrite only a portion of a register), they may introduce additional, undesirable complexities to the computer's architecture.

Accordingly, it may be desirable to reduce the risk of a read-after-write hazard associated with immediate value, write-based instructions, without having to stall the pipeline.

SUMMARY OF THE DISCLOSURE

Embodiments of the disclosure provide fusing immediate value, write-based instructions in instruction processing circuits. Related processor systems, methods, and computer-readable media are also disclosed. In one embodiment, a first instruction indicating an operation writing an immediate value to a register is detected by an instruction processing circuit. The instruction processing circuit also detects at least one subsequent instruction that indicates an operation that overwrites at least one first portion of the register while maintaining a value of a second portion of the register. The subsequent instruction(s) are converted (or replaced) with a fused instruction(s), which indicates an operation writing the at least one first portion and the second portion to the register. In this manner, conversion of multiple instructions for generating a constant into the fused instruction(s) removes the potential for a read-after-write hazard and associated consequences caused by dependencies between certain instructions in a pipelined computing architecture. Furthermore, the number of clock cycles required to process the immediate value, write-based instructions may be reduced by replacing the one or more subsequent instructions with, or converting the one or more subsequent instructions into, fused instructions comprising fewer operations and/or requiring fewer clock cycles.

In this regard, in one embodiment, an instruction processing circuit is provided. The instruction processing circuit is configured to detect a first instruction indicating an operation writing an immediate value to a register. The instruction processing circuit is also configured to detect at least one subsequent instruction indicating an operation overwriting at least one first portion of the register and maintaining a value of a second portion of the register. The instruction processing circuit is further configured to convert the at least one subsequent instruction into at least one fused instruction indicating an operation writing the at least one first portion and the second portion of the register.

In another embodiment, an instruction processing circuit is provided. The instruction processing circuit comprises a means for detecting a first instruction indicating an operation writing an immediate value to a register. The instruction processing circuit also comprises a means for detecting at least one subsequent instruction indicating an operation overwriting at least one first portion of the register and maintaining a value of a second portion of the register. The instruction processing circuit also comprises a means for converting the at least one subsequent instruction into at least one fused instruction indicating an operation writing the at least one first portion and the second portion of the register.

In another embodiment, a method for processing computer instructions is provided. The method comprises detecting a first instruction indicating an operation writing an immediate value to a register. The method also comprises detecting at least one subsequent instruction indicating an operation overwriting at least one first portion of the register and maintaining a value of a second portion of the register. The method also comprises converting the at least one subsequent instruction into at least one fused instruction indicating an operation writing the at least one first portion and the second portion of the register.

In another embodiment, a non-transitory computer-readable medium having stored thereon computer-executable instructions to cause a processor to implement a method is provided for detecting a first instruction indicating an operation writing an immediate value to a register. The method implemented by the computer-executable instructions further includes detecting at least one subsequent instruction indicating an operation overwriting at least one first portion of the register and maintaining a value of a second portion of the register, and converting the at least one subsequent instruction into at least one fused instruction indicating an operation writing the at least one first portion and the second portion of the register.

DETAILED DESCRIPTION

Figure 1:
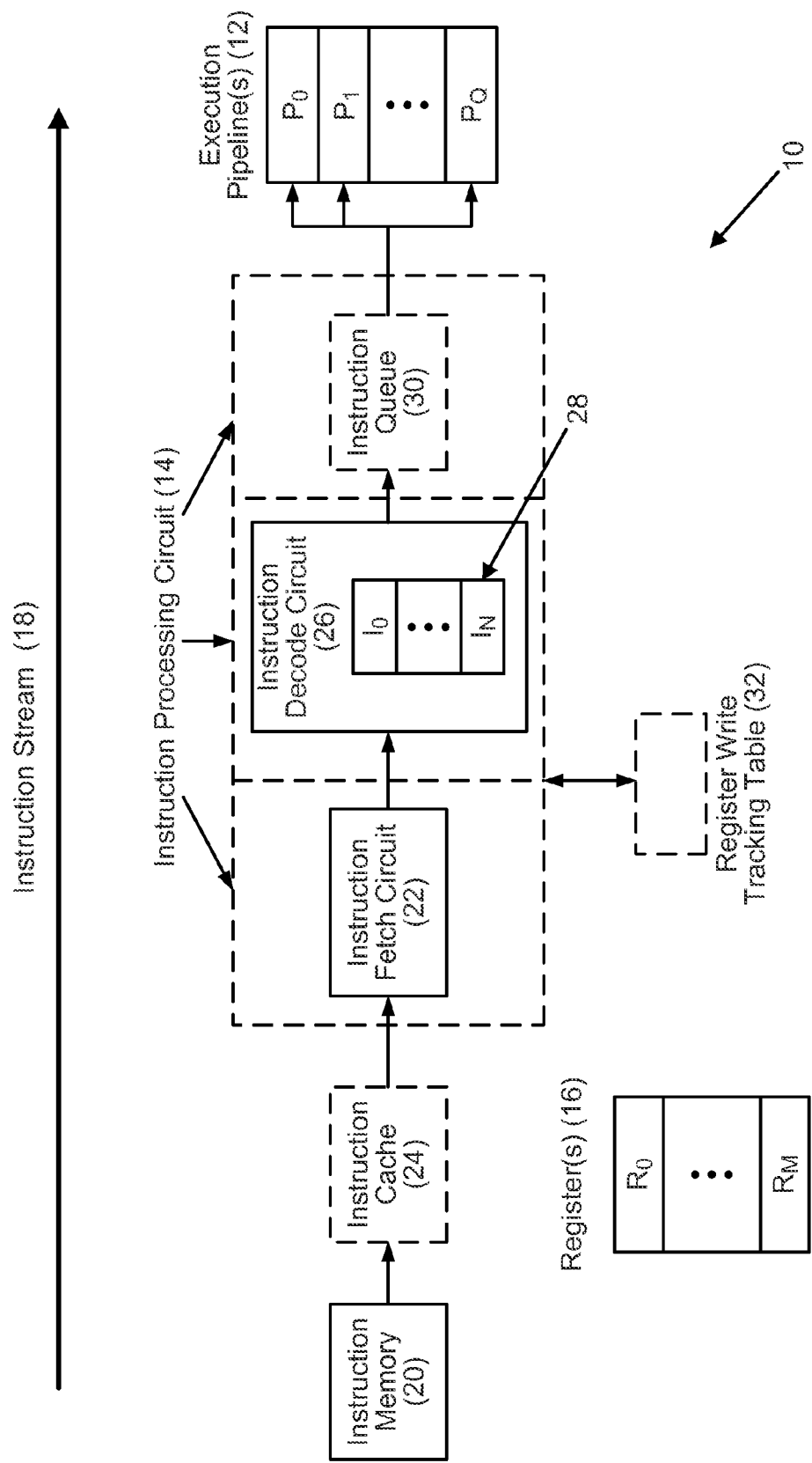
FIG. 1 is a block diagram of exemplary components provided in a processor-based system for retrieving and processing computer instructions to be placed into one or more execution pipelines, including an exemplary instruction processing circuit configured to detect and convert immediate value, write-based instructions into a fused instruction(s)

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide fusing immediate value, write-based instructions in instruction processing circuits. Related processor systems, methods, and computer-readable media are also disclosed. In one embodiment, a first instruction indicating an operation writing an immediate value to a register is detected by an instruction processing circuit. The instruction processing circuit also detects at least one subsequent instruction that indicates an operation that overwrites at least one first portion of the register while maintaining a value of a second portion of the register. The subsequent instruction(s) are converted (or replaced) with a fused instruction(s), which indicates an operation writing the at least one first portion and the second portion to the register. In this manner, conversion of multiple instructions for generating a constant into the fused instruction(s) removes the potential for a read-after-write hazard and associated consequences caused by dependencies between certain instructions in a pipelined computing architecture. Furthermore, the number of clock cycles required to process the immediate value, write-based instructions may be reduced by replacing the one or more subsequent instructions with, or converting the one or more subsequent instructions into, fused instructions comprising fewer operations and/or requiring fewer clock cycles.

In this regard, FIG. 1 is a block diagram of an exemplary processor-based system 10 for retrieving and processing computer instructions to be placed into one or more execution pipelines 12(0-Q). The processor-based system 10 provides an instruction processing circuit 14 that is configured to fuse immediate value, write-based instructions, as will be discussed in more detail below. As discussed herein, "instructions" may refer to a combination of bits, defined by an instruction set architecture, that direct a computer processor to carry out a specified task. For example, instructions may indicate operations for reading data from and/or writing data to registers 16(0-m), which provide local high-speed storage accessible by the processor-based system 10. Exemplary instruction set architectures include, but are not limited to, ARM, Thumb, and A64 architectures.

With reference back to FIG. 1, in the processor-based system 10, instructions are processed in a continuous flow represented by an instruction stream 18. The instruction stream 18 may be continuously processed while the processor-based system 10 is operating and executing the instructions. In this illustrated example, the instruction stream 18 begins with an instruction memory 20, which provides persistent storage for the instructions in a computer-executable program.

An instruction fetch circuit 22 reads an instruction from the instruction memory 20 and/or from an instruction cache 24, and may increment a program counter, typically stored in one of the registers 16(0-M). The instruction cache 24 is an optional buffer that may be provided and coupled to both the instruction memory 20 and the instruction fetch circuit 22 to allow direct access to cached instructions by the instruction fetch circuit 22. The instruction cache 24 may speed up instruction retrieval time, but at a cost of potentially longer read times if the instruction was not previously stored in the instruction cache 24.

Once the instruction is fetched by the instruction fetch circuit 22, it proceeds to an instruction decode circuit 26, which translates the instruction into processor-specific microinstructions. In this embodiment, the instruction decode circuit 26 holds a set of multiple instructions 28(0-N) simultaneously for decoding. After the instructions have been fetched and decoded, they may be issued to an optional instruction queue 30 (i.e., an optional buffer for storing instructions pending issuance), or they may be issued directly to one of the execution pipeline(s) 12(0-Q) for execution. In some embodiments, the execution pipeline(s) 12(0-Q) may restrict the types of operations that can be carried out by instructions that execute within the execution pipeline(s) 12(0-Q). For example, execution pipeline $P_0$ may not permit read access to the registers 16(0-M); accordingly, an instruction that indicates an operation to read register $R_0$ could only be issued to one of the execution pipeline(s) $P_1$ through $P_Q$.

With continuing reference to FIG. 1, the instruction processing circuit 14 is configured to detect and fuse immediate value, write-based instructions to remove read-after-write hazards for these instructions, and to reduce the number of clock cycles required to execute these instructions. The instruction processing circuit 14 may be any type of device or circuit; however, in some embodiments, the instruction processing circuit 14 is incorporated into the instruction fetch circuit 22, the instruction decode circuit 26, and/or the optional instruction queue 30. The instruction processing circuit 14 may also employ a register write tracking table 32 to track immediate values written by the instructions to one of the registers 16(0-M). As will be discussed with respect to examples for FIGS. 3 through 4C below, the instruction processing circuit 14 may use the register write tracking table 32 to pair an instruction that writes an immediate value to a register 16 with one or more subsequent instructions that partially modify the immediate value in the register 16. In some embodiments, the register write tracking table 32 may contain one data row dedicated to each register 16 (which may provide a simpler implementation compared to other embodiments), while some embodiments may provide that the register write tracking table 32 may store an identifier of a register 16 and a corresponding immediate value (which may result in a smaller memory footprint compared to other embodiments). Data for a register 16 stored in the register write tracking table 32 is flushed whenever any conditions occur that render the data unusable for pairing instructions for fusing, such as, e.g., an execution pipeline in which the register 16 was written is flushed, and/or a register 16 is written (or may be conditionally written) by another type of instruction. In some embodiments discussed herein, the register write tracking table 32 may include a valid bit associated with each register 16 that indicates whether the data for the register 16 is valid (i.e., usable for pairing instructions for fusing).

Figure 2:
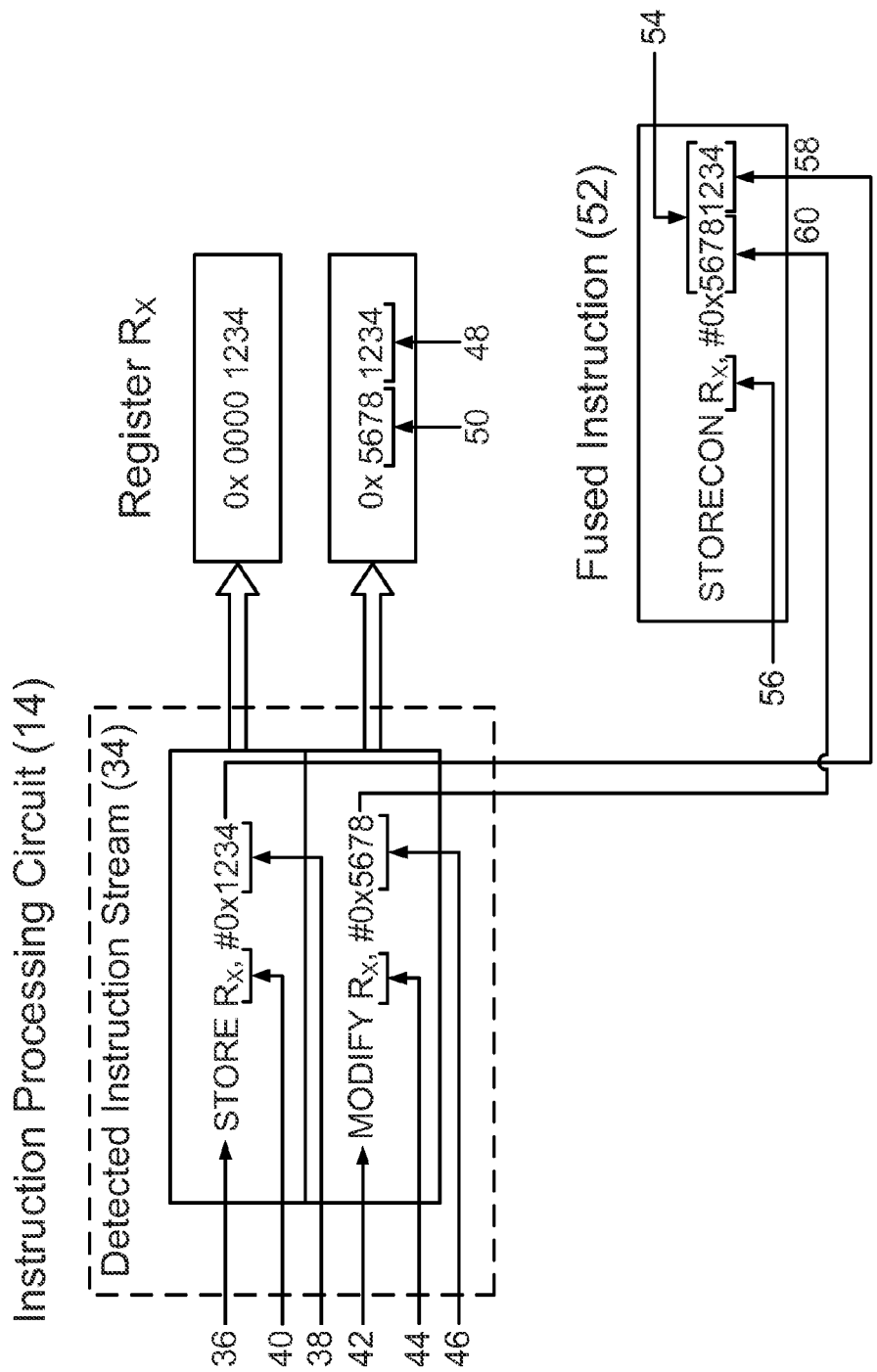
FIG. 2 is a diagram illustrating an exemplary conversion of a subsequent register modify instruction into a fused instruction, based on detecting a first instruction indicating an operation moving an immediate value to the same register.

To provide an explanation for fusing immediate value, write-based instructions in the processor-based system 10 of FIG. 1, FIG. 2 is provided. FIG. 2 illustrates an exemplary conversion of a subsequent register modify instruction into a fused instruction, based on the instruction processing circuit 14 of FIG. 1 detecting a first instruction indicating an operation moving an immediate value to the register 16. In this example, a detected instruction stream 34 represents a series of instructions fetched in the instruction stream 18 and detected by the instruction processing circuit 14 of FIG. 1. In this example, a first instruction 36 in the detected instruction stream 34 is a STORE instruction, indicating an operation to write immediate value 38 (a 16-bit hexadecimal value of 0x1234) to a register indicated by an operand 40. In this example, the operand 40 points to one of the registers 16(0-M) shown in FIG. 1, referred to in this example as register $R_X$. Further along in the detected instruction stream 34 is a subsequent instruction 42, which is a MODIFY instruction indicating an operation to overwrite a first portion comprising the top 16 bits of register $R_X$ indicated by an operand 44 with an immediate value 46 (a 16-bit hexadecimal value of 0x5678) while leaving a second portion comprising the bottom 16 bits of register $R_X$ unchanged. If executed, the MODIFY instruction may result in the register $R_X$ containing a value including a portion 48 corresponding to the immediate value 38 and a portion 50 corresponding to the immediate value 46.

The instruction processing circuit 14 of FIG. 1 detects and converts the subsequent instruction 42 into a fused instruction 52 (i.e., a STORECON or "store constant" instruction), which indicates an operation to write a combined immediate value 54 (having the 32-bit hexadecimal value 0x56781234) to the register $R_X$, indicated by an operand 56. In converting the subsequent instruction 42 into the fused instruction 52, the instruction processing circuit 14 generates the combined immediate value 54 by combining the immediate value 38 associated with the first instruction 36 with the immediate value 46 associated with the subsequent instruction 42. The MODIFY instruction is replaced with the STORECON instruction, which may require fewer processor clock cycles to perform than the MODIFY instruction. This fusing also eliminates the potential for a read-after-write hazard for the STORE/MODIFY instruction pair. As illustrated in FIG. 2, a portion 58 of the combined immediate value 54 corresponds to the immediate value 38, while a portion 60 of the combined immediate value 54 corresponds to the immediate value 46.

Figure 3:
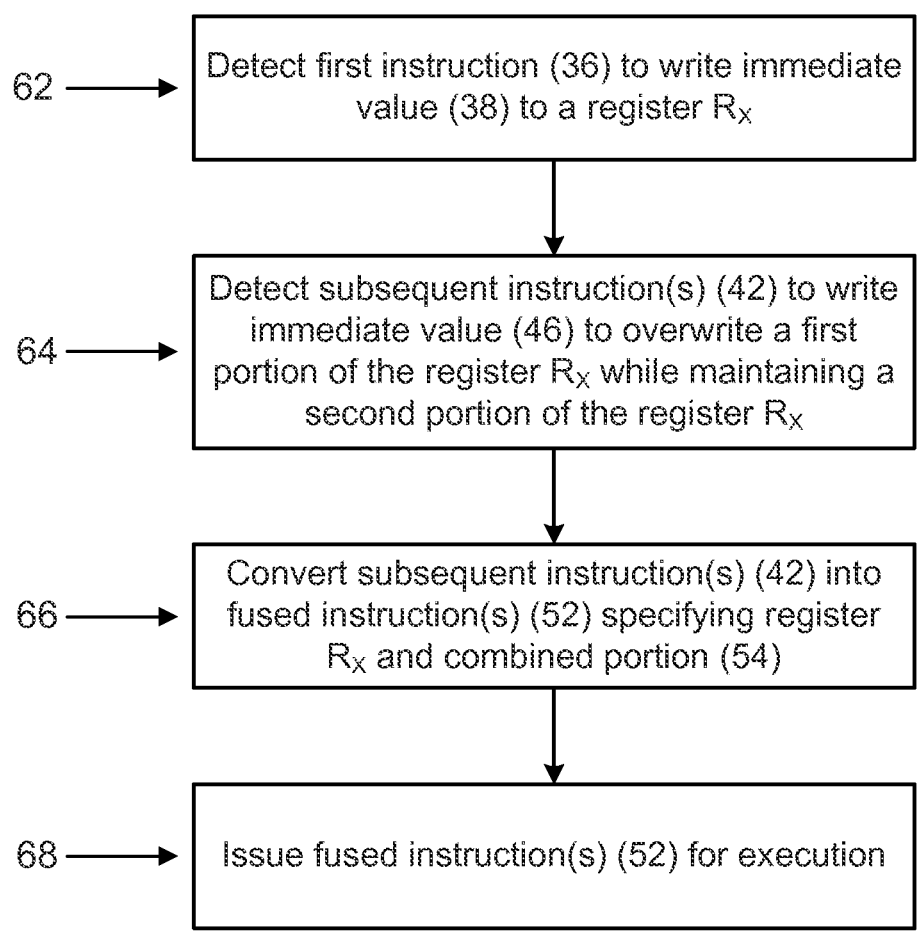
FIG. 3 is a flowchart illustrating an exemplary process of an instruction processing circuit for detecting and converting immediate value, write-based instructions into a fused instruction(s)

To further illustrate fusing immediate value, write-based instructions, an exemplary generalized process for an instruction processing circuit configured to detect and fuse immediate value, write-based instructions is illustrated by FIG. 3, with further reference to FIGS. 1 and 2. In this example, the process begins by the instruction processing circuit 14 detecting the first instruction 36 to write the immediate value 38 to a particular one of the registers 16(0-M) indicated by the operand 40, such as register $R_X$ (block 62). The instruction processing circuit 14 next detects at least one subsequent instruction 42 overwriting at least one portion of the value in register $R_X$ with the immediate value 46 (the results of which are illustrated by the portion 50), while maintaining a portion of the value in the register $R_X$ (portion 48) (block 64). The instruction processing circuit 14 then converts the subsequent instruction(s) 42 into at least one fused instruction 52 to write the combined immediate value 54 to the register $R_X$ in a single write operation (block 66). The instruction processing circuit 14 next issues the fused instruction(s) 52 for execution in one of the execution pipeline(s) 12(0-Q) (block 68). As discussed in more detail with respect to FIG. 6 below, the instruction processing circuit 14 may replace the first instruction 36 with a "no operation" instruction (e.g., NOP) or remove the first instruction 36, and may replace the subsequent instruction 42 with the fused instruction 52. In another example, the instruction processing circuit 14 may replace the first instruction 36 with the fused instruction 52 and may replace the subsequent instruction 42 with a "no operation" instruction (e.g., NOP) or remove the subsequent instruction 42. In a further example, the instruction processing circuit 14 leaves the first instruction 36 unchanged, and replaces the subsequent instruction 42 with a fused instruction 52.

Figure 4A:
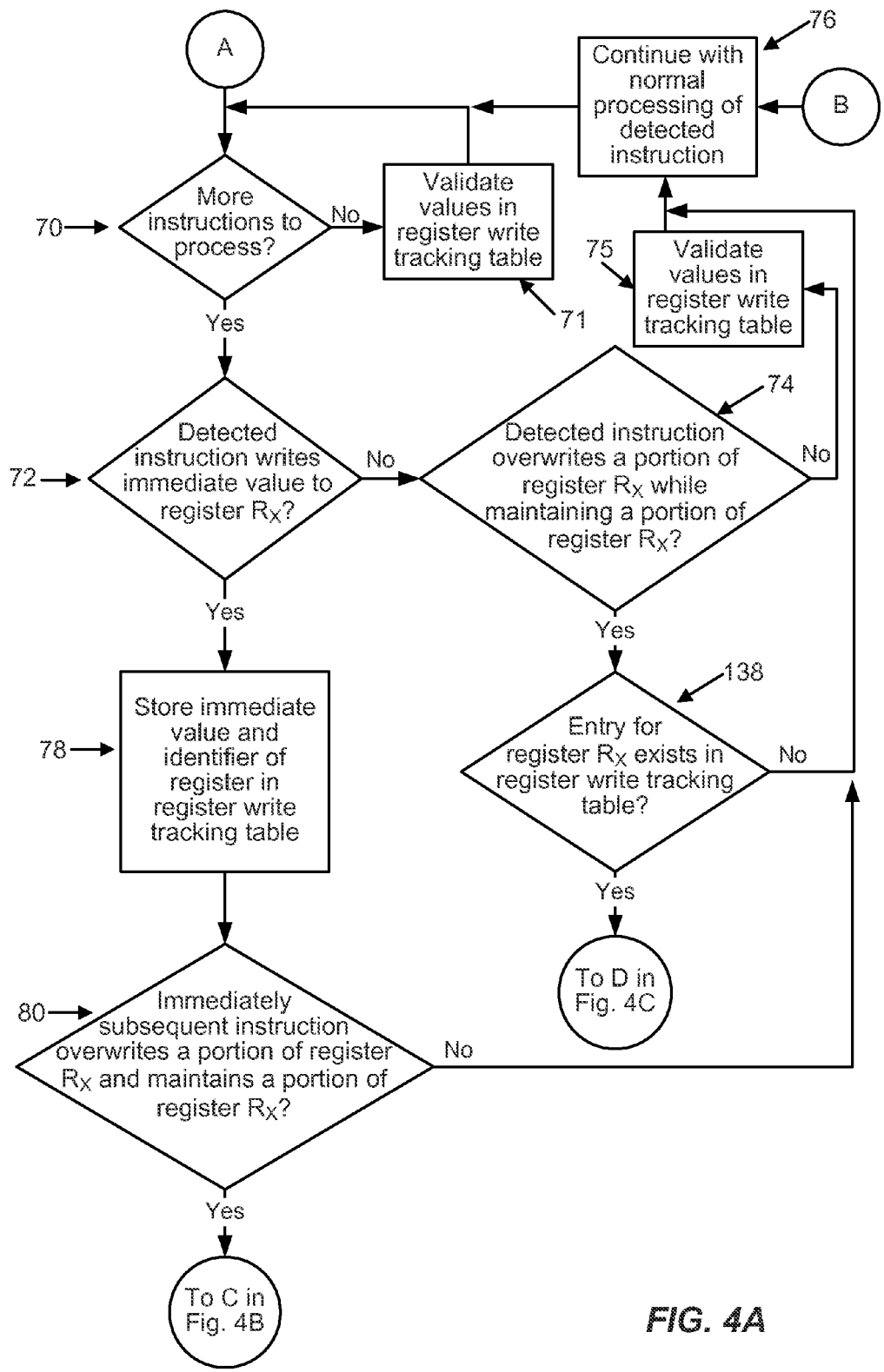
FIGS. 4A-4C comprise a flowchart illustrating a more detailed exemplary process of an instruction processing circuit for detecting first instructions indicating an operation writing an immediate value to a register and converting immediate value, write-based instructions into a fused instruction(s) in an instruction stream.
Figure 4B:
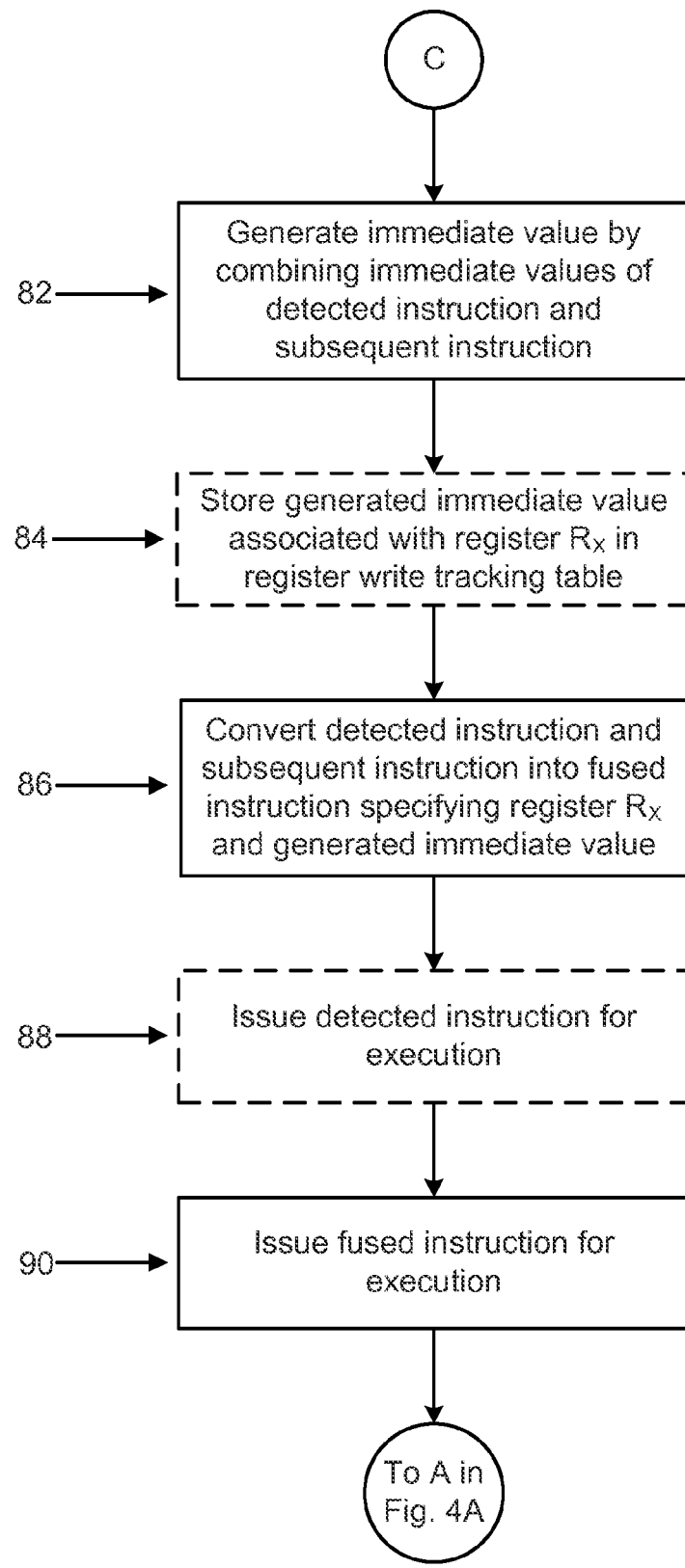
Figure 4C:
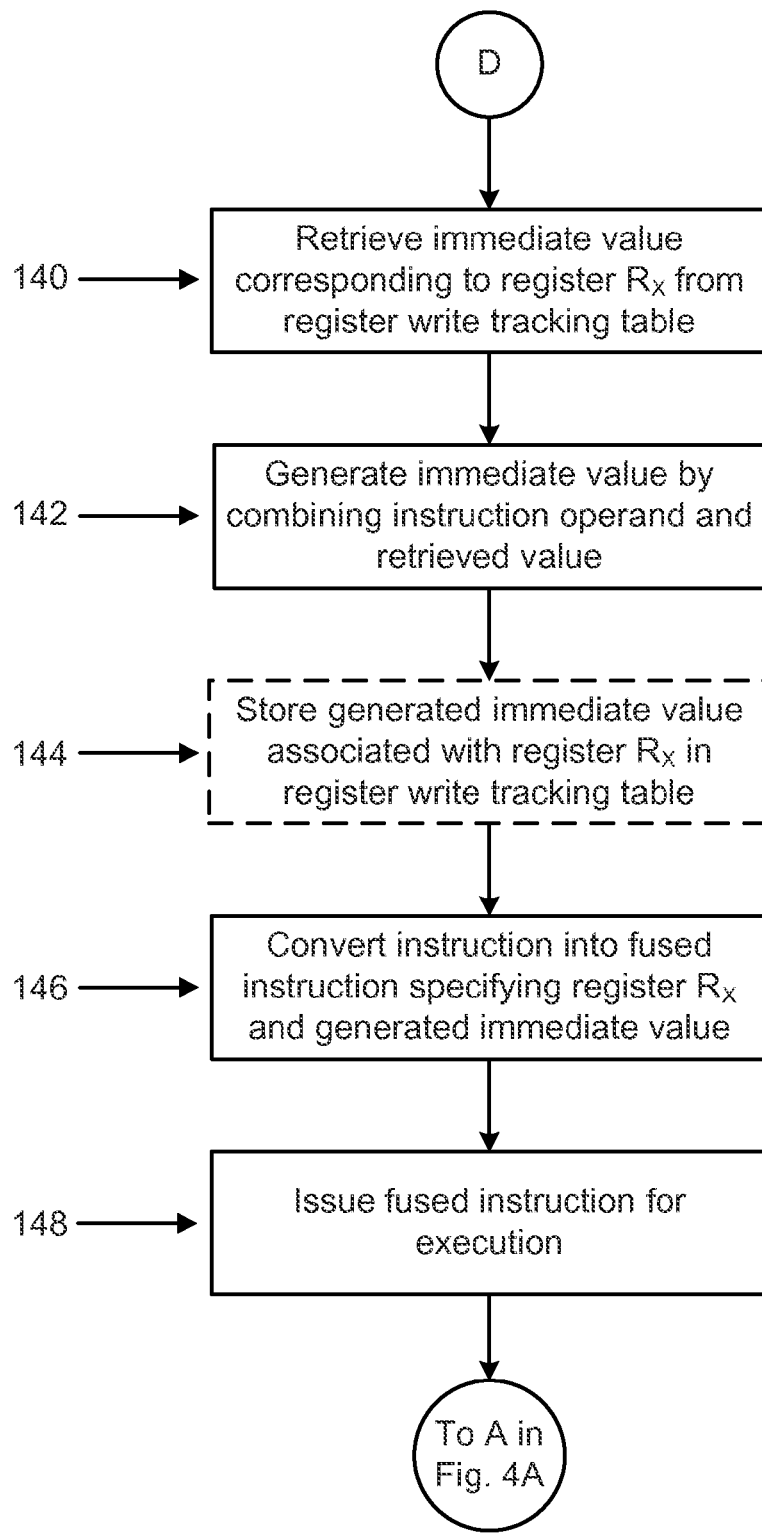

FIGS. 4A-4C illustrate a more detailed exemplary process of an instruction processing circuit the instruction processing circuit 14 of FIG. 1) for detecting a first instruction indicating an operation writing an immediate value to a register, and then fusing immediate value, write-based instructions in an instruction stream (e.g., the instruction stream 18 of FIG. 1). FIG. 4A details a process for determining whether circumstances exist under which immediate value, write-based instructions may be fused. FIG. 4B illustrates operations for fusing instructions that are consecutively fetched from the instruction stream, while FIG. 4C details operations for fusing non-consecutive instructions (i.e., instructions separated in the instruction stream by other intervening instructions).

The process in this example begins in FIG. 4A with the instruction processing circuit detecting whether more instructions remain to be processed (block 70 of FIG. 4A). In some embodiments, this detection is accomplished b detecting the presence of unprocessed instructions in the instruction fetch circuit and/or the instruction decode circuit (such as the instruction fetch circuit 22 and the instruction decode circuit 26, respectively, of FIG. 1). If no remaining instructions are detected, the instruction processing circuit validates any previously-stored immediate values in a register write tracking table (for example, the register write tracking table 32 of FIG. 1) (block 71 of FIG. 4A). For example, a previously-stored immediate value in the register write tracking table may no longer be usable for pairing instructions for fusing because another value was written to a corresponding register, or because an execution pipeline flush occurred. In some embodiments, the instruction processing circuit may indicate that a previously-stored immediate value is no longer valid by clearing a valid bit associated with the immediate value in the register write tracking table. The instruction processing circuit then returns to block 70 of FIG. 4A.

If a remaining instruction is detected, the instruction processing circuit determines whether the detected instruction indicates an operation to write an immediate value to register $R_X$ (such as one of the registers 16(0-M) of FIG. 1) (block 72 of FIG. 4A). Detection of such an instruction indicates that the instruction processing circuit may be able to convert one or more subsequent instructions within the instruction stream into a fused instruction. In the event that a detected instruction does not indicate an operation to write an immediate value to the register $R_X$, the instruction processing circuit next determines whether the detected instruction overwrites a first portion of the register $R_X$ while maintaining a second portion of the register $R_X$ (block 74 of FIG. 4A). If not, no opportunities for fusing instructions presently exist. The instruction processing circuit then validates any previously-stored immediate values in the register write tracking table as discussed above (block 75 of FIG. 4A), and processing of the detected instruction continues (block 76 of FIG. 4A). The instruction processing circuit then returns to block 70 of FIG. 4A.

Referring back to the decision point at block 72 of FIG. 4A, if the detected instruction does indicate an operation to write an immediate value to the register $R_X$, the instruction processing circuit stores the immediate value of the detected instruction and an identifier of register $R_X$ in the register write tracking table (block 78 of FIG. 4A). In some embodiments, storing the immediate value and the identifier of register $R_X$ in the register write tracking table includes setting a valid bit corresponding to the immediate value in the register write tracking table. The valid bit may serve as an indicator that the register write tracking table currently contains an immediate value for register $R_X$ that may be usable for pairing a subsequent instruction with the first detected instruction for fusing.

The instruction processing circuit then determines whether an instruction is detected immediately subsequent to the first detected instruction, wherein the immediately subsequent instruction indicates an operation that overwrites a first portion of register $R_X$ while maintaining a second portion of register $R_X$ (block 80 of FIG. 4A). If an immediately subsequent instruction indicating an operation that overwrites a first portion of register $R_X$ while maintaining a second portion of register $R_X$ is not detected, no opportunities for fusing instructions presently exist. Accordingly, processing of the detected instruction continues (block 76 of FIG. 4A), after which the instruction processing circuit returns to block 70 of FIG. 4A.

Returning to the decision point at block 80 of FIG. 4A, if the immediately subsequent instruction is detected overwriting a first portion of register $R_X$ while maintaining a second portion of register $R_X$, the instruction processing circuit has detected consecutive immediate value, write-based instructions in the instruction stream that may be converted into a fused instruction. In this scenario, the instruction processing circuit proceeds to block 82 of FIG. 4B.

Referring now to FIG. 4B, operations for fusing consecutive immediate value, write-based instructions are illustrated. The instruction processing circuit generates an immediate value to be written to register $R_X$ by combining the overwritten first portion and the maintained second portion of register $R_X$ (block 82 of FIG. 4B). In some embodiments, generating the immediate value may be based on an immediate value and an identifier of the register $R_X$ that were previously stored in the register write tracking table. After generating the immediate value, the instruction processing circuit may optionally store the newly generated immediate value and the identifier of register $R_X$ in the register write tracking table (block 84 of FIG. 4B). Storing the newly generated immediate value may be unnecessary in some embodiments in which at most two instructions are fused in any exemplary instance. However, as discussed in greater detail below, in some embodiments, storing the newly generated immediate value in the register write tracking table may enable the fusing of additional subsequent instructions.

The instruction processing circuit then converts the detected instruction and the immediately subsequent instruction into a fused instruction that specifies register $R_X$ and the generated combined immediate value (block 86 of FIG. 4B). The instruction processing circuit may optionally issue the detected instruction for execution (block 88 of FIG. 4B). As discussed above and in FIG. 6 below, in some embodiments, the instruction processing circuit may issue a "no operation" instruction (e.g., NOP) in place of the detected instruction, or remove the detected instruction entirely. The instruction processing circuit then issues the fused instruction for execution (block 90 of FIG. 4B), and processing resumes at block 70 of FIG. 4A.

Figure 5:
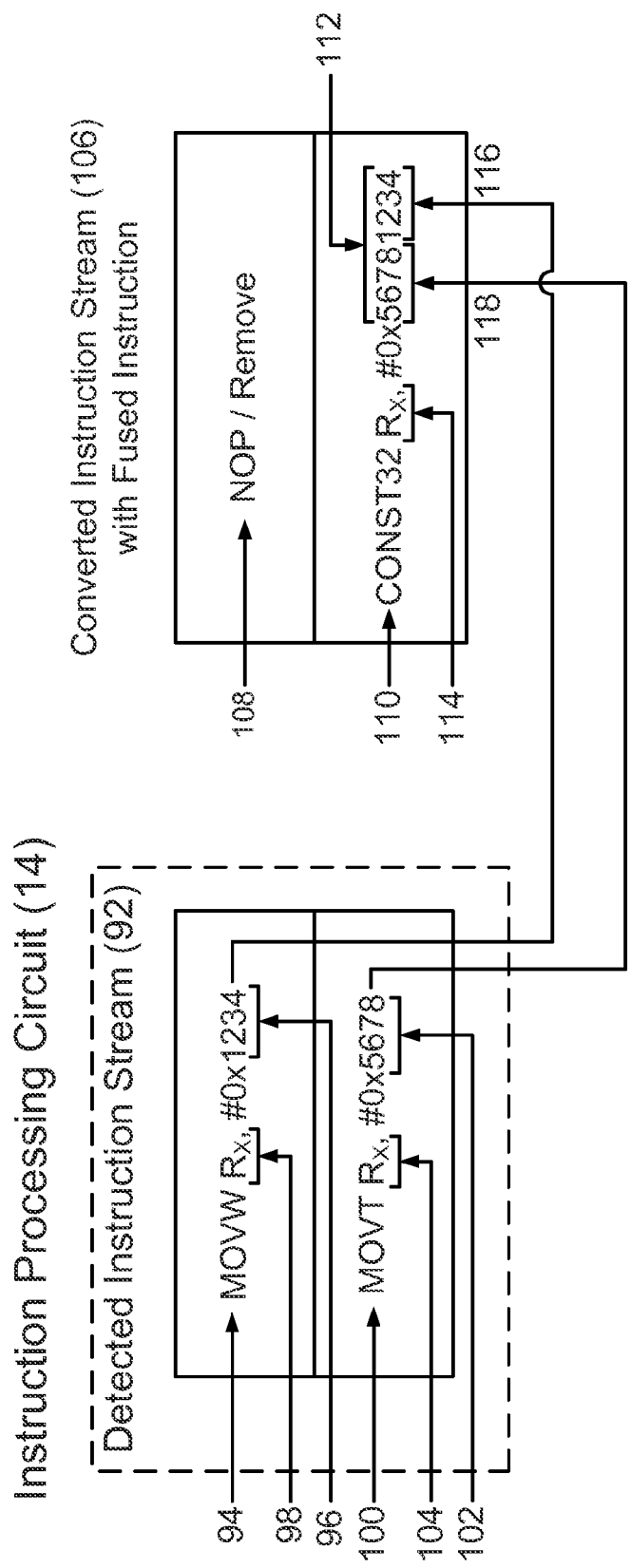
FIG. 5 is a diagram illustrating an exemplary conversion of consecutive immediate value, write-based instructions into a single fused instruction.

An exemplary conversion of consecutive immediate value, write-based instructions into a fused instruction, as described in FIGS. 4A and 4B, is further illustrated in FIG. 5, with reference to FIG. 1. In FIG. 5, a detected instruction stream 92 depicts a series of instructions detected by the instruction processing circuit 14 as they proceed through the instruction stream 18 (not shown). In this example, a first instruction 94 detected in the detected instruction stream 92 is the ARM architecture MOVW instruction. The MOVW instruction indicates an operation writing an immediate value 96 (having a hexadecimal value of 0x1234) into a register specified by an operand 98, which is one of the registers 16(0-M) (referred to in this example as register $R_X$, where $0 \leq X \leq M$). Because the MOVW instruction is a 32-bit instruction, the size of the immediate value 96 is limited to less than 32 bits (for example, a number of bits must be reserved for indicating a target register and an encoding for the immediate value). In this example, the ARM architecture limits the size of the immediate value 96 to 16 bits. Accordingly, if executed, the MOVW instruction may write the 16 bits of the immediate value 96 into the lower 16 bits of register $R_X$, and write zeros into the upper 16 bits of the register $R_X$.

Immediately following the first instruction 94 in the detected instruction stream 92 is a subsequent instruction 100, which is the ARM architecture MOVT instruction. The MOVT instruction indicates an operation writing an immediate value 102 (having a hexadecimal value of 0x5678) into the top 16 bits of register $R_X$, specified by an operand 104, while maintaining the original value of the bottom 16 bits of the register $R_X$. It is to be understood that the MOVW and MOVT instructions each operate on the entire register $R_X$, even though only a portion of the register $R_X$ may be modified by the instruction.

A converted instruction stream 106 illustrates the instructions issued for execution after processing by the instruction processing circuit 14. In the converted instruction stream 106, the first instruction 94 (the MOVW instruction) has been replaced by an instruction 108, the ARM architecture NOP instruction, which indicates no operation. In some embodiments, the instruction 108 may be removed entirely (i.e., may be discarded or otherwise not issued for execution). The subsequent instruction 100 is converted into a fused instruction 110. In this example, the fused instruction 110 is instruction CONST32 (i.e., "constant 32") indicating an operation to write a 32-bit combined immediate value 112 (having a hexadecimal value of 0x56781234) into register $R_X$, specified by an operand 114. The combined immediate value 112 is generated by the instruction processing circuit 14 by combining a portion 116, corresponding to the immediate value 96 of the first instruction 94, with a portion 118, corresponding to the immediate value 102 of the subsequent instruction 100. By fusing the first instruction 94 and the subsequent instruction 100 into the CONST32 fused instruction 110, the instruction processing circuit 14 enables a 32-bit immediate value to be written to register $R_X$ using a single instruction, rather than requiring a MOVW instruction followed immediately by a MOVT instruction. As a result, the CONST32 fused instruction 110 eliminates the possibility of a read-after-write hazard associated with the MOVW/MOVT instruction pair, and may execute using fewer processor clock cycles than the MOVW/MOVT instruction pair.

In this example, the first instruction 94 is replaced with the NOP instruction 108 or removed from the instruction stream 18, and the subsequent instruction 100 is replaced with the CONST32 fused instruction 110. It is to be understood that, in some embodiments, the first instruction 94 may remain unchanged in the instruction stream 8 preceding the CONST32 fused instruction 110 that replaces the subsequent instruction 100. According to some embodiments described herein, the first instruction 94 may be replaced with the CONST32 fused instruction 110, and the subsequent instruction 100 may be replaced with the NOP instruction 108 or removed from the instruction stream 18. In some embodiments, the CONST32 fused instruction 110 may comprise the first instruction 94 redefined to combine the operations of the first instruction 94 and the subsequent instruction 100, or may comprise the subsequent instruction 100 redefined to combine the operations of the first instruction 94 and the subsequent instruction 100.

Figure 6:
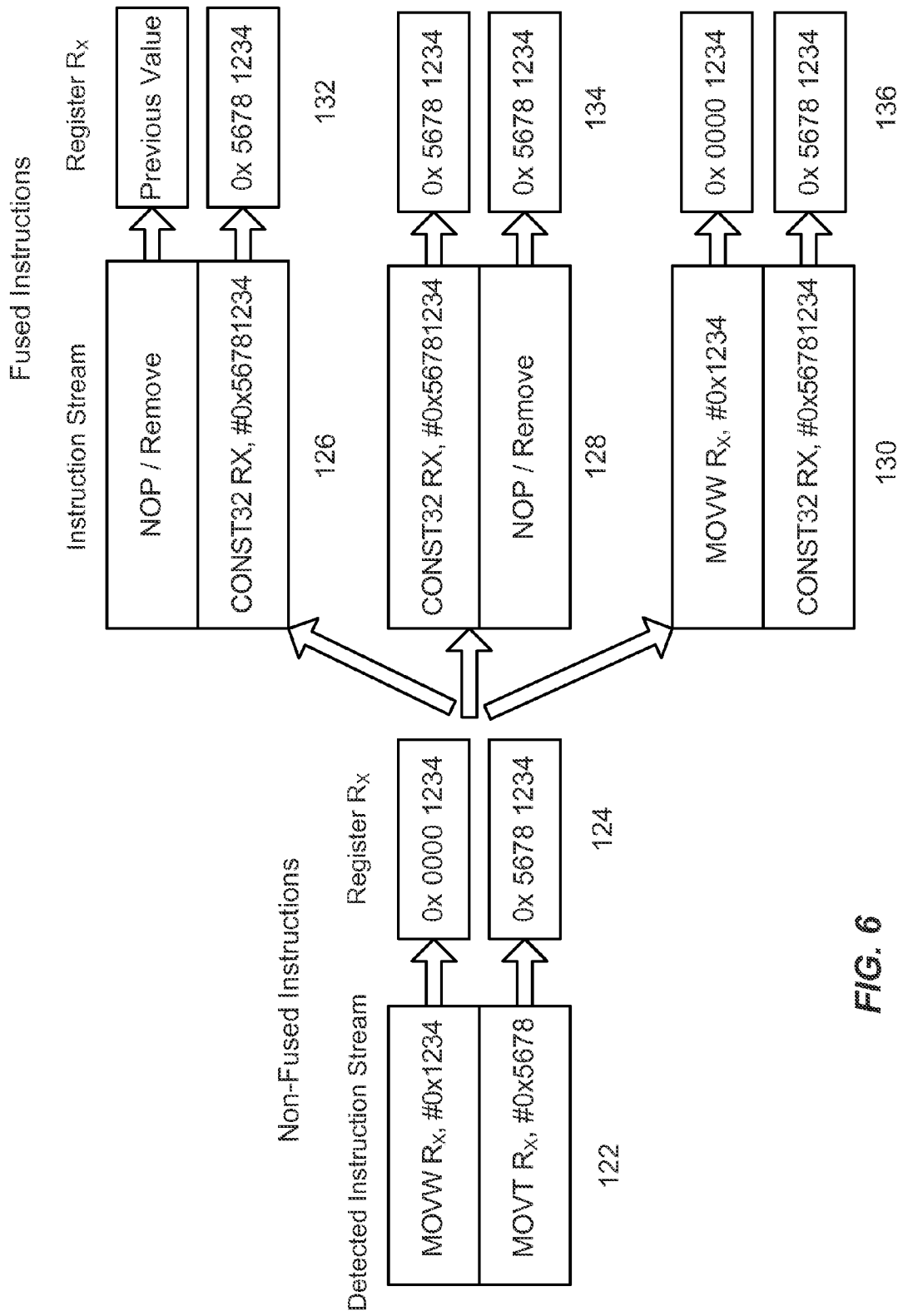
FIG. 6 is a diagram showing an exemplary set of consecutive, non-fused instructions involving immediate value, write-based instructions, and corresponding fused instructions involving immediate value, write-based instructions.

In this regard. FIG. 6 shows an exemplary set of consecutive, non-fused instructions involving immediate value, write-based instructions, and corresponding fused instructions involving immediate value, write-based instructions employing the instruction processing circuit 11 of FIG. 1 and the process of FIG. 3 and/or FIGS. 4A and 4B. A detected instruction stream 122 of FIG. 6 includes two consecutive ARM instructions: a MOVW instruction writing an immediate value having hexadecimal value 0x1234 to register $R_X$, immediately followed by a MOVT instruction writing an immediate value having hexadecimal value 0x5678 to the top 16 bits of register $R_X$. The effects of the consecutive instructions in the detected instruction stream 122 on the value stored in register $R_X$ is shown in table 121, in this example, the MOVW instruction writes hexadecimal value 0x1234 into the bottom 16 bits of register $R_X$, and writes zeros into the top 16 bits of register $R_X$. The subsequent MOVT instruction then writes hexadecimal value 0x5678 into the top 16 bits of register $R_X$, while leaving the bottom 16 bits unchanged.

Instruction streams 126, 128, and 130 illustrate exemplary sequences of instructions including fused instructions into which the instructions in the detected instruction stream 122 may be converted by the instruction processing circuit 14. In some embodiments, converting the subsequent instruction into a fused instruction may include replacing the first instruction in the detected instruction stream 122 with a "no operation" instruction (e.g., NOP) or removing the first instruction, and replacing the subsequent instruction with a fused instruction. Accordingly, instruction stream 126 comprises an NOP instruction or a removed instruction, immediately followed by fused instruction CONST32 writing a 32-bit immediate value having hexadecimal value 0x56781234 to register $R_X$. In table 132, the effects of the instruction stream 126 on the value stored in register $R_X$ are illustrated. The first NOP/removed instruction has no effect on register $R_X$, so register $R_X$ retains its previously held value. The execution of the subsequent CONST32 fused instruction writes the hexadecimal value 0x56781234 to register $R_X$ in a single operation.

According to some embodiments described herein, converting the subsequent instruction into a fused instruction may include replacing the first instruction in the detected instruction stream 122 with a fused instruction, and replacing the subsequent instruction with a "no operation" instruction (e.g., NOP) or removing the subsequent instruction. Thus, in instruction stream 128, the CONST32 fused instruction writes a 32-bit immediate value having hexadecimal value 0x56781234 to register $R_X$, and is immediately followed by an NOP instruction or a removed instruction. The effects of the instruction stream 128 on the value stored in register $R_X$ are shown in table 134. The execution of the CONST32 fused instruction writes the hexadecimal value 0x56781234 to register $R_X$ in a single operation. The subsequent NOP/removed instruction has no effect on register $R_X$, so register $R_X$ retains hexadecimal value 0x56781234.

In some embodiments, converting the subsequent instruction into a fused instruction may include leaving the first instruction unchanged, and replacing the subsequent instruction with a fused instruction. Accordingly, instruction stream 130 comprises a MOVW instruction writing an immediate value having hexadecimal value 0x1234 to register $R_X$, immediately followed by the CONST32 fused instruction writing a 32-bit immediate value having hexadecimal value 0x56781234 to register $R_X$. In table 136, the effects of the instruction stream 130 on the value stored in register $R_X$ are illustrated. The MOVW instruction, when executed, writes hexadecimal value 0x1234 into the bottom 16 bits of register $R_X$, and writes zeros into the top 16 bits of register R. The execution of the subsequent CONST32 fused instruction then writes the hexadecimal value 0x56781234 to register $R_X$ in a single operation.

Referring back to the decision point at block 74 of FIG. 4A, the instruction processing circuit is configured to next identify whether non-consecutive immediate value, write-based instructions (i.e., immediate value, write-based instructions that are separated in the instruction stream by other intervening instructions) can be fused. If the detected instruction does overwrite a first portion of register $R_X$ while maintaining a second portion of register $R_X$ (block 74 of FIG. 4A), the instruction processing circuit consults the register write tracking table to determine whether the register write tracking table contains an entry associated with the register $R_X$ (block 138 of FIG. 4A). If no entry for register $R_X$ exists in the register write tracking table, processing of the detected instruction continues (block 76 of FIG. 4A), after which the instruction processing circuit returns to block 70 of FIG. 4A. If the register write tracking table does contain an entry for register $R_X$, the instruction processing circuit has identified non-consecutive instructions that may be converted into a fused instruction, and processing continues at block 140 of FIG. 4C.

Operations for fusing non-consecutive instructions are illustrated in FIG. 4C, to which reference is now made. The instruction processing circuit retrieves the immediate value from the entry associated with register $R_X$ in the register write tracking table (block 140 of FIG. 4C). The instruction processing circuit next generates an immediate value to be written to register $R_X$ by combining the immediate value retrieved from the register write tracking table with the immediate value operand of the detected instruction (block 142 of FIG. 4C). After generating the immediate value, the instruction processing circuit may optionally store the newly generated immediate value and an identifier of register $R_X$ in the register write tracking table (block 144 of FIG. 4C). Storing the newly generated immediate value may not be necessary in some embodiments in which at most two instructions are fused in any exemplary instance. However, as discussed in greater detail below, in some embodiments, storing the newly generated combined immediate value may enable the fusing of additional subsequent instructions. The instruction processing circuit converts the detected instruction into a fused instruction that includes an indicator of register $R_X$ and the generated combined immediate value (block 146 of FIG. 4C). The instruction processing circuit issues the fused instruction for execution (block 148 of FIG. 4C), and the instruction processing circuit proceeds to block 70 of FIG. 4A.

Figure 7:
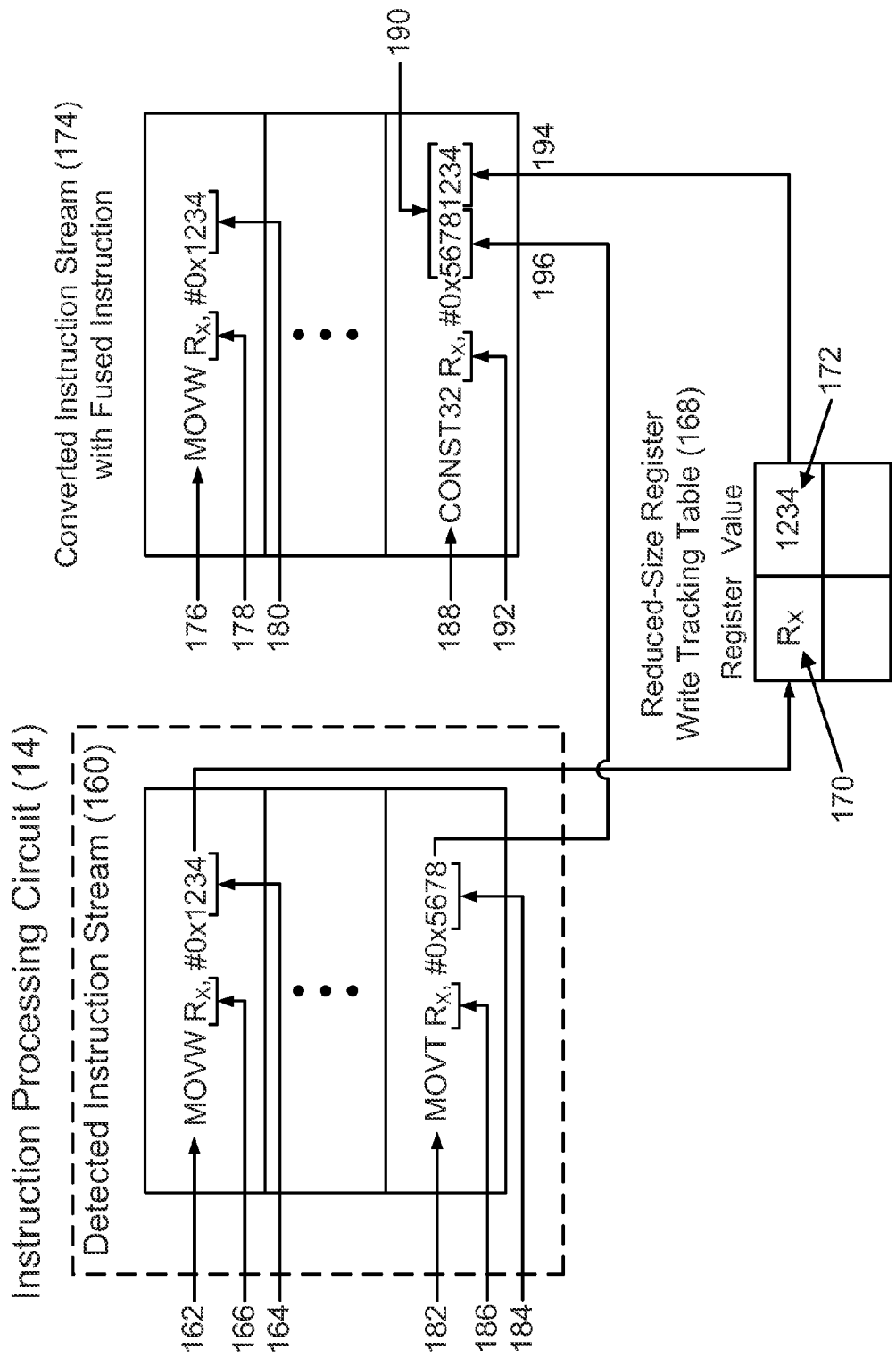
FIG. 7 is a diagram illustrating an exemplary conversion of non-consecutive, immediate value write-based instructions into a fused instructions) employing a reduced-size register write tracking table.
Figure 10:
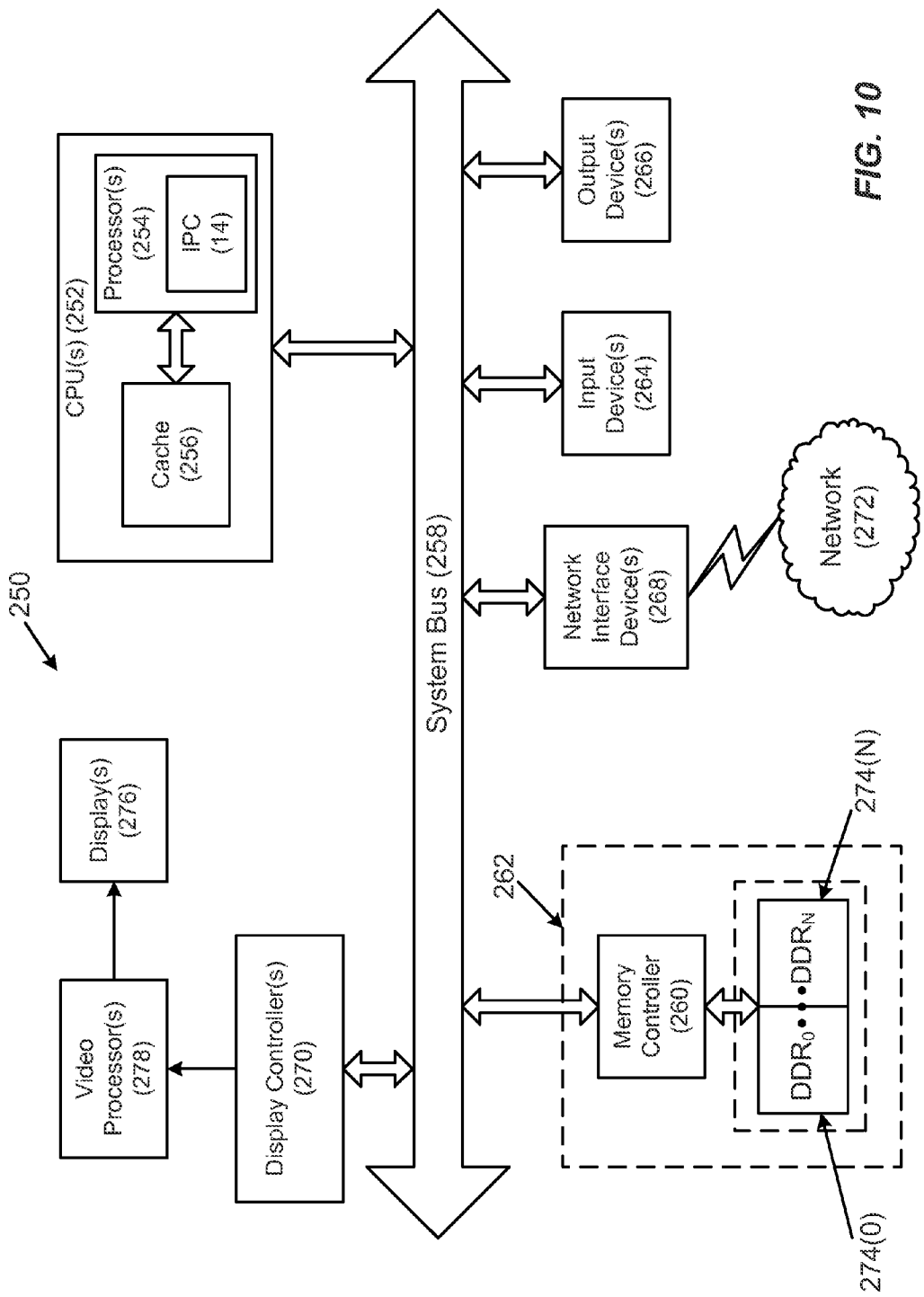
FIG. 10 is a block diagram of an exemplary processor-based system that can include instruction processing circuits, including the instruction processing circuit of FIG. 1, configured to fuse immediate value, write-based instructions.

FIG. 7 illustrates an exemplary conversion of non-consecutive, immediate value, write-based instructions into a fused instruction(s), with reference to FIGS. 1 and 10. Detected instruction stream 160 shows a series of instructions detected by the instruction processing circuit 14 as they proceed through the instruction stream 18 (not shown). A detected first instruction 162 is the ARM architecture MOVW instruction, which indicates an operation writing an immediate value 164 (having a hexadecimal value of 0x1234) into a register specified by an operand 166, which is one of the registers 16(0-M) (referred to in this example as register $R_X$, where $0 \le X \le M$). As noted above, the MOVW instruction is a 32-bit instruction; consequently, the size of the immediate value 164 is limited to less than 32 bits (to reserve bits for, e.g., indicating a target register and an encoding for the immediate value 164). In this example, the ARM architecture limits the size of the immediate value 164 to 16 bits. Thus, the MOVW instruction, if executed, may have the effect of writing the 16 bits of the immediate value 164 into the lower 16 bits of the register $R_X$, and writing zeros into the upper 16 bits of the register $R_X$.

Upon detection of the first instruction 162, the instruction processing circuit 14 stores data in a reduced-size register write tracking table 168 to facilitate the detection of subsequent instruction(s). Data field 170 in the reduced-size register write tracking table 168 stores an identifier of register $R_X$, while data field 172 in the reduced-size register write tracking table 168 stores the immediate value 164 associated with the first instruction 162. In this example, storing both the register indicator and the immediate value 164 in the reduced-size register write tracking table 168 may result in a smaller memory footprint when compared to other embodiments of the register write tracking table 32 of FIG. 1 having one data row dedicated to each register. The first instruction 162 is then permitted to continue execution, and issues unchanged into converted instruction stream 174 as instruction 176, operand 178, and immediate value 180.

At a point further along in the detected instruction stream 160 (but not immediately following the first instruction 162), the instruction processing circuit 14 detects a subsequent instruction 182, which in this example is the ARM architecture MOVT instruction. The MOVT instruction indicates an operation to write an immediate value 184 (having a hexadecimal value of 0x5678) into the top 16 bits of the register $R_X$ specified by an operand 186, while maintaining the original value of the bottom 16 bits of the register $R_X$. It is to be understood that the MOVW and MOVT instructions each operate on the entire register $R_X$, even though only a portion of the register $R_X$ may be modified by the instruction.

Upon determining that the register $R_X$ specified by the operand 186 matches the register indicator stored in data field 170, the instruction processing circuit 14 converts the subsequent instruction 182 into a fused instruction 188 (as seen in the converted instruction stream 174). The fused instruction 188 is a CONST32 instruction indicating an operation writing a 32-bit combined immediate value 190, having a hexadecimal value of 0x56781234, into register $R_X$ specified by an operand 192. The combined immediate value 190 is generated by the instruction processing circuit 14 by combining a portion 194, corresponding to the immediate value 164 stored in data field 172 of the reduced-size register write tracking table 168, with a portion 196, corresponding to the immediate value 184 of the subsequent instruction 182. By converting the subsequent instruction 182 into the CONST32 fused instruction 188, the instruction processing circuit 14 can enable the 32-bit combined immediate value 190 to be written to register $R_X$ in a single write operation, rather than requiring the use of a MOVT instruction that involves register read, modify, and write operations.

Figure 8:
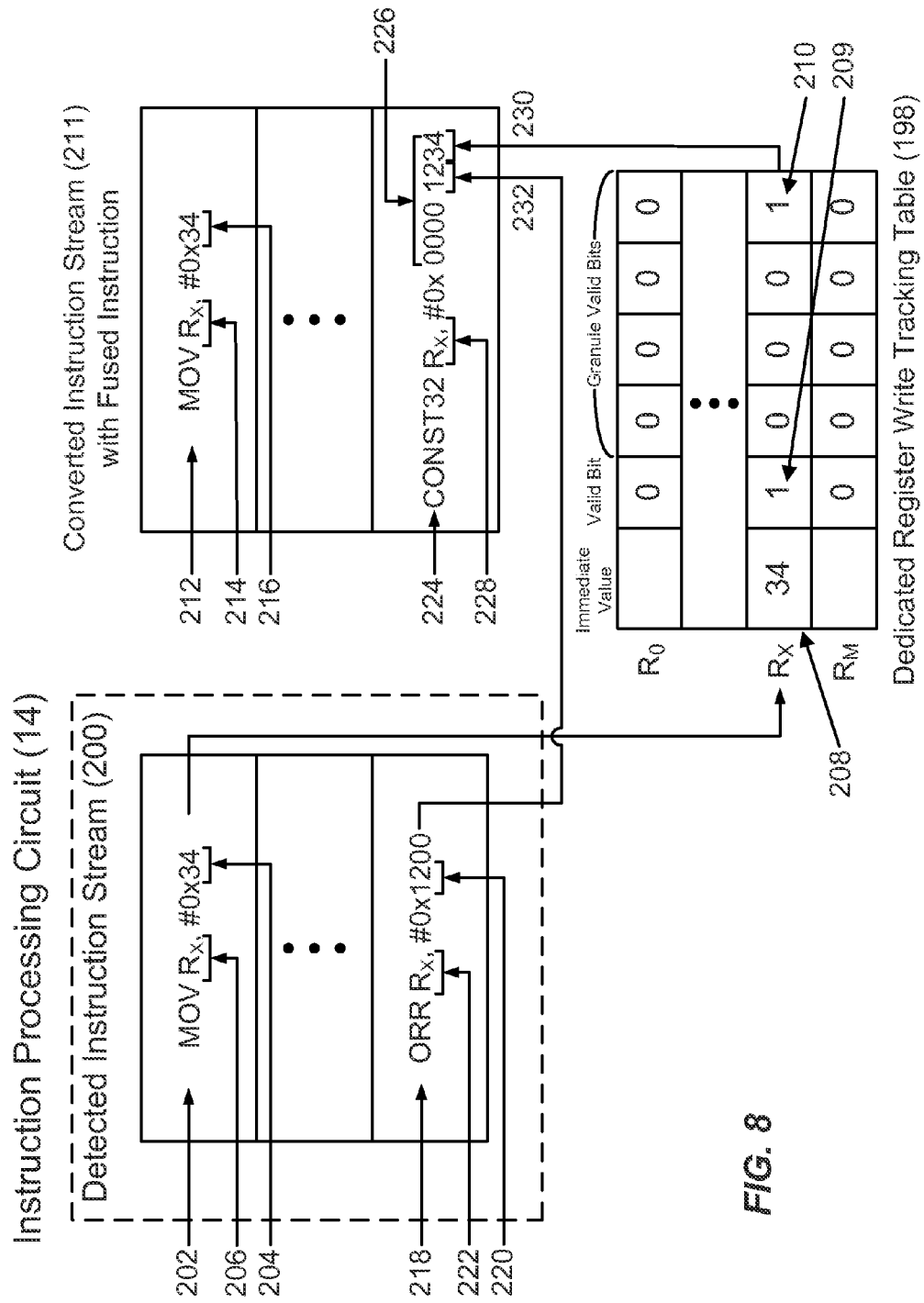
FIG. 8 is a diagram illustrating an exemplary conversion of non-consecutive immediate value write-based instructions into a fused instruction(s) employing a dedicated register write tracking table.

FIG. 8, like FIG. 7, illustrates an exemplary conversion of non-consecutive, immediate value, write-based instructions into a fused instruction(s), with reference to FIGS. 1 and 10. In this example, however, the instruction processing circuit 14 makes use of a dedicated register write tracking table 198. The dedicated register write tracking table 198 contains one data row for each of the registers 16(0-M). By providing a data row dedicated to each of the registers 16(0-M), the dedicated register write tracking table 198 may provide a simpler implementation when compared to the reduced-size register write tracking table 168 of FIG. 7. In this example, each data row includes an immediate value field, a valid bit field, and a plurality of granule valid bits. The valid bit field contains a valid bit that indicates whether the immediate value stored in the dedicated register write tracking table 198 for the corresponding register is usable for pairing instructions for fusion. The granule valid bits correspond to a plurality of granules of a predefined size (such as one byte) which constitute the corresponding register. Because the granule size in this example is defined as one byte (i.e., 8 bits) and each of the registers 16(0-M) contains 32 bits, each data row of the dedicated write tracking table 198 contains four granule valid bits for the corresponding register. By setting one or more granule valid bits, the instruction processing circuit 14 can indicate precisely which portion(s) of the corresponding register have been written since the entry in the table was last invalidated. Accordingly, in some embodiments, the use of granule valid bits may enable the instruction processing circuit 14 to detect, pair, and fuse a wider range of instructions, such the ARM architecture ORR (logical OR) instruction.

A detected instruction stream 200 shows a series of instructions detected by the instruction processing circuit 14 as they proceed through the instruction stream 18 (not shown). A detected first instruction 202 in the detected instruction stream 200 is the ARM architecture MOV instruction. The MOV instruction indicates an operation writing an immediate value 204 (having a hexadecimal value of 0x34) into a register specified by an operand 206, which is one of the registers 16(0-M) (referred to in this example as register $R_X$, where $0 \leq X \leq M$). The MOV instruction is a 32-bit instruction; consequently, the size of the immediate value 204 is limited to less than 32 bits so that a number of bits may be reserved for indicating data, such as a target register and an encoding for the immediate value 204. In this example, the ARM architecture limits the size of the immediate value 204 to 8 bits. Accordingly, the MOV instruction, if executed, may have the effect of writing the 8 bits of the immediate value 204 into the lower 8 bits of the register $R_X$, and writing zeros into the upper 24 bits of the register $R_X$.

Upon detection of the first instruction 202, the instruction processing circuit 14 stores data in the dedicated register write tracking table 198 to facilitate the detection of subsequent instruction(s). In this example, data row 208 is dedicated to the register $R_X$, and is used to store the immediate value 204 associated with the first instruction 202. Additionally, a valid hit 209 associated with the immediate value 204 and the register $R_X$ is set to indicate that the immediate value 204 is known to be currently valid, and the granule valid bit 210 is set to indicate that the first instruction 202 wrote to the lowest byte of the register $R_X$. The first instruction 202 then continues execution, and appears unchanged in a converted instruction stream 211 as instruction 212, operand 214, and immediate value 216.

At a point further along in the detected instruction stream 200 (but not immediately following the first instruction 202), the instruction processing circuit 14 detects a subsequent instruction 218, which in this example is the ARM architecture ORR (logical OR) instruction. The ORR instruction 218 indicates a logical OR operation using an immediate value 220 (having a hexadecimal value of 0x1200) and the value of one of registers 16(0-M) specified by an operand 222 (in this example, register $R_X$). In some embodiments, a granule valid bit (not shown) will be set to indicate that the ORR instruction wrote a value to one byte of the register $R_X$. It is to be understood that the MOV and ORR instructions each operate on the entire register $R_X$, even though only a portion of the register $R_X$ may be modified by the instruction.

In the converted instruction stream 211, the subsequent instruction 218 is converted into fused instruction 224. The fused instruction 224 is a CONST32 instruction indicating an operation writing a 32-bit combined immediate value 226 (having a hexadecimal value of 0x00001234) into register $R_X$ specified by an operand 228. The combined immediate value 226 is generated by the instruction processing circuit 14 by combining a portion 230, corresponding to the immediate value 204 stored in data row 208 of the dedicated register write tracking table 198, with a portion 232, corresponding to the immediate value 220 of the subsequent instruction 218. In generating the combined immediate value 226, the instruction processing circuit 14 may utilize the granule valid bit 210 to determine which portion(s) of register $R_X$ was modified by preceding instructions. By converting the subsequent instruction 218 into the CONST32 fused instruction 224, the instruction processing circuit 14 can enable the 32-bit combined immediate value 226 to be written to the register $R_X$ in a single write operation, rather than requiring the use of an ORR operation involving register read, modify, and write operations.

It is to be understood that, in scenarios such as the examples illustrated by FIGS. 5, 7, and 8, the subsequent instruction itself may be followed by additional write instructions that also overwrite only a portion of the value in the register $R_X$ while maintaining a portion of the value in the register $R_X$. For instance, in FIG. 8, the subsequent instruction 218 may be followed by one or more additional ORR instructions that modify the upper two bytes of the register $R_X$. In such a scenario, some embodiments may provide that the instruction processing circuit 14 may fuse the one or more additional subsequent write instructions with the first instruction 202 and the subsequent instruction 218. Accordingly, to facilitate the fusing of multiple subsequent instructions, the instruction processing circuit 14, upon generating the combined immediate value (such as the immediate value 112 of FIG. 5, the immediate value 190 of FIG. 7, and the immediate value 226 of FIG. 8), may then store the combined immediate value in the data row associated with the register $R_X$ in the register write tracking table 32.

Figure 9:
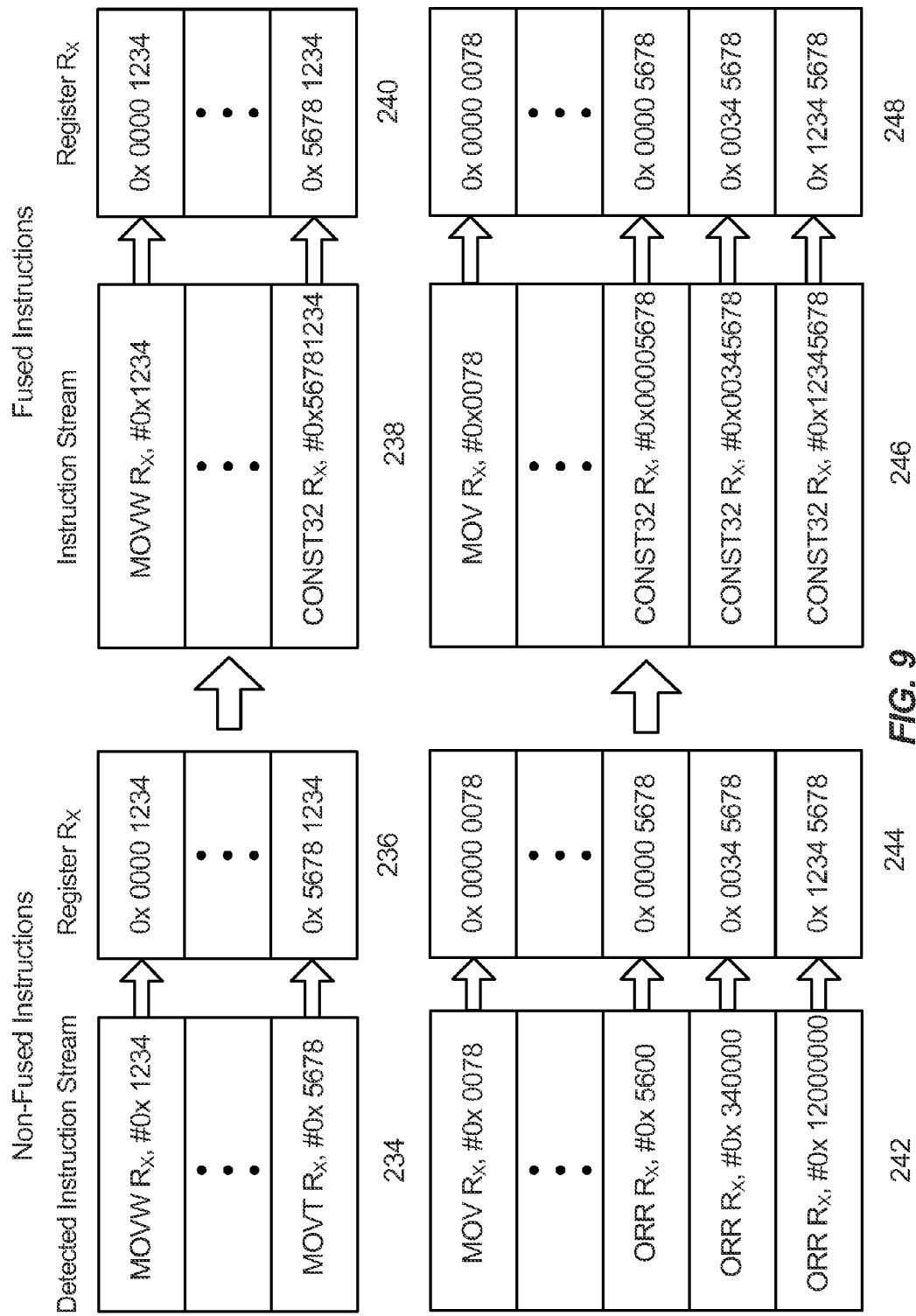
FIG. 9 is a diagram showing exemplary sets of non-consecutive, non-fused instructions involving immediate value, write-based instructions, and corresponding fused instructions involving immediate value, write-based instructions.

FIG. 9 is a diagram showing exemplary sets of non-consecutive, non-fused instructions involving immediate value, write-based instructions, and exemplary corresponding fused instructions involving immediate value, write-based instructions employing the instruction processing circuit 14 of FIG. 1. Detected instruction stream 234 includes two non-consecutive ARM architecture instructions: a MOVW instruction writing an immediate value having hexadecimal value 0x1234 to register $R_X$, followed by a MOVT instruction writing an immediate value having hexadecimal value 0x5678 to the top 16 bits of the register $R_X$. The effects of the non-consecutive instructions in the detected instruction stream 234 on the value stored in the register $R_X$ is shown in table 236. Execution of the MOVW instruction causes hexadecimal value 0x1234 to be written into the bottom 16 bits of the register $R_X$, and zeros to be written into the top 16 bits of the register $R_X$. The subsequent MOVT instruction then writes hexadecimal value 0x5678 into the top 16 bits of the register $R_X$, while leaving the bottom 16 bits unchanged.

An instruction stream 238 illustrates an exemplary sequence of instructions, including fused instructions, into which the non-consecutive instructions in the detected instruction stream 234 may be converted by the instruction processing circuit 14. In this regard, the instruction stream 238 includes the MOVW instruction writing an immediate value having hexadecimal value 0x1234 to the register $R_X$. The MOVW instruction is followed by fused instruction CONST32 writing a 32-bit immediate value having hexadecimal value 0x56781234 to the register $R_X$. Table 240 illustrates the effects of the instruction stream 238 on the value stored in the register $R_X$. The MOVW instruction writes hexadecimal value 0x1234 into the bottom 16 bits of the register $R_X$, and writes zeros into the top 16 bits of the register $R_X$. The execution of the subsequent CONST32 fused instruction writes the hexadecimal value 0x56781234 to the register $R_X$ in a single operation. While the effects on the register $R_X$ may appear identical to those illustrated in table 236, the CONST32 fused instruction may consume fewer processor clock cycles compared to the original MOVT instruction in the detected instruction stream 234. These effects occur because execution of the original MOVT instruction requires reading the value of register $R_X$, modifying the value, and then writing the value back to the register $R_X$, while the CONST32 instruction writes the 32-bit immediate value to the register $R_X$ in a single operation.

A detected instruction stream 242 includes a series of non-consecutive ARM architecture instructions: a MOV instruction writing an immediate value (having hexadecimal value 0x0078) to the register $R_X$; an ORR instruction performing a logical OR operation using an immediate value (having a hexadecimal value of 0x5600) and the value of the register $R_X$; an ORR instruction performing a logical OR operation using an immediate value (having a hexadecimal value of 0x340000) and the value of the register $R_X$; and an ORR instruction performing a logical OR operation using an immediate value (having a hexadecimal value of 0x12000000) and the value of the register $R_X$. The effects of the non-consecutive instructions in the detected instruction stream 242 on the value stored in the register $R_X$ is shown in table 244. The MOV instruction, when executed, writes hexadecimal value 0x0078 into the bottom 16 bits of the register $R_X$, and writes zeros into the top 16 bits of the register $R_X$. The three subsequent ORR instructions then modify the top twenty-four bits of the register $R_X$ one byte at a time, resulting in the top three bytes of the register $R_X$ having the hexadecimal value 0x123456 and leaving the bottom eight bits of the register $R_X$ unchanged.

An instruction stream 246 illustrates an exemplary sequence of instructions, including fused instructions, into which the non-consecutive instructions in the detected instruction stream 242 may be converted by the instruction processing circuit 14. In this regard, the instruction stream 246 includes the MOV instruction writing an immediate value having hexadecimal value 0x0078 to the register $R_X$. The MOV instruction is followed by a series of three CONST32 fused instructions writing the 32-bit immediate values 0x00005678, 0x00345678, and 0x12345678, respectively, to the register $R_X$. Table 248 illustrates the effects of the instruction stream 246 on the value stored in the register $R_X$. The MOV instruction writes hexadecimal value 0x0078 into the bottom 16 bits of the register $R_X$, and writes zeros into the top 16 bits of the register $R_X$. The contents of the register $R_X$ is then modified by the subsequent CONST32 fused instructions to have the values 0x00005678, 0x00345678, and 0x12345678, respectively. The effects on register $R_X$ may appear identical to those of the instruction stream 242, but each of the CONST32 fused instructions may consume fewer processor resources compared to each original ORR instructions in the detected instruction stream 242.

The instruction processing circuits fusing immediate value, write-based instructions according to embodiments disclosed herein may be provided in or integrated into any processor-based device, or into a semiconductor die. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

In this regard, FIG. 10 illustrates an example of a processor-based system 250 that can employ the instruction processing circuit 14 illustrated in FIG. 1. In this example, the processor-based system 250 includes one or more central processing units (CPUs) 252, each including one or more processors 254. The processor(s) 254 may comprise the instruction processing circuit (IPC) 14. The CPU(s) 252 may have cache memory 256 coupled to the processor(s) 254 for rapid access to temporarily stored data. The CPU(s) 252 is coupled to a system bus 258 and can intercouple master and slave devices included in the processor-based system 250. As is well known, the CPU(s) 252 communicates with these other devices by exchanging address, control, and data information over the system bus 258. For example, the CPU(s) 252 can communicate bus transaction requests to a memory controller 260, as an example of a slave device. Although not illustrated in FIG. 10, multiple system buses 258 could be provided.

Other master and slave devices can be connected to the system bus 258. As illustrated in FIG. 10, these devices can include a memory system 262, one or more input devices 264, one or more output devices 266, one or more network interface devices 268, and one or more display controllers 270, as examples. The input device(s) 264 can include any type of input device, including but not limited to input keys, switches, voice processors, etc. The output device(s) 266 can include any type of output device, including but not limited to audio, video, other visual indicators, etc. The network interface device(s) 268 can be any devices configured to allow exchange of data to and from a network 272. The network 272 can be any type of network, including but not limited to a wired or wireless network, a private or public network, a local area network (LAN), a wide local area network (WLAN), and the Internet. The network interface device(s) 268 can be configured to support any type of communication protocol desired. The memory system 262 can include one or more memory units 274(0-N).

The CPU(s) 252 may also be configured to access the display controller(s) 270 over the system bus 258 to control information sent to one or more displays 276. The display controller(s) 270 sends information to the display(s) 276 to be displayed via one or more video processors 278, which process the information to be displayed into a format suitable for the display(s) 276. The display(s) 276 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope herein.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An instruction processing circuit configured to:
   detect a first instruction from an instruction stream indicating an operation writing an immediate value to a register;
   detect at least one subsequent instruction in the instruction stream indicating an operation overwriting at least one first portion of the register and maintaining a value of a second portion of the register; and
   convert the at least one subsequent instruction into at least one fused instruction, representing an encoding of one or more processor-specific microinstructions, indicating an operation writing the at least one first portion and the second portion of the register.

2. The instruction processing circuit of claim 1 further configured to store the immediate value and an identifier of the register associated with the first instruction in a register write tracking table; and
   the instruction processing circuit configured to detect the at least one subsequent instruction in the instruction stream indicating the operation overwriting the at least one first portion of the register based on the identifier of the register stored in the register write tracking table.

3. The instruction processing circuit of claim 1 configured to detect the first instruction and the at least one subsequent instruction fetched consecutively in the instruction stream.

4. The instruction processing circuit of claim 3 further configured to issue the first instruction and the at least one fused instruction for execution.

5. The instruction processing circuit of claim 3 configured to convert the at least one subsequent instruction into the at least one fused instruction that combines the operations of the first instruction and the at least one subsequent instruction.

6. The instruction processing circuit of claim 5 further configured to remove the first instruction from the instruction stream.

7. The instruction processing circuit of claim 5 further configured to replace the first instruction in the instruction stream with an instruction indicating no operation.

8. The instruction processing circuit of claim 3 configured to convert the at least one subsequent instruction into the at least one fused instruction that combines the operations of the first instruction and the at least one subsequent instruction.

9. The instruction processing circuit of claim 8 further configured to remove the at least one subsequent instruction from the instruction stream.

10. The instruction processing circuit of claim 8 further configured to replace the at least one subsequent instruction in the instruction stream with an instruction indicating no operation.

11. The instruction processing circuit of claim 2 configured to:
- detect the first instruction and the at least one subsequent instruction fetched non-consecutively in the instruction stream;
- detect the at least one subsequent instruction in the instruction stream indicating the operation overwriting the at least one first portion of the register based on the identifier of the register stored in the register write tracking table; and
- convert the at least one subsequent instruction into the at least one fused instruction based on the immediate value stored in the register write tracking table.

12. The instruction processing circuit of claim 2 configured to store the immediate value and the identifier of the register in at least one data row dedicated to the register in the register write tracking table, the at least one data row comprising the immediate value.

13. The instruction processing circuit of claim 2 configured to store the immediate value and the identifier of the register in at least one data row in the register write tracking table, the at least one data row comprising the immediate value and the identifier of the register.

14. The instruction processing circuit of claim 1, wherein the first instruction and the at least one subsequent instruction are ARM architecture-based instructions; and
- wherein the first instruction is a MOVW instruction, and the at least one subsequent instruction is selected from the group consisting of: a MOVT instruction and an ORR instruction.

15. The instruction processing circuit of claim 1 integrated into a semiconductor die.

16. The instruction processing circuit of claim 1, further comprising a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

17. An instruction processing circuit, comprising:
- a means for detecting a first instruction indicating an operation moving an immediate value to a register;
- a means for detecting at least one subsequent instruction indicating an operation overwriting at least one first portion of the register and maintaining a value of a second portion of the register; and
- a means for converting the at least one subsequent instruction into at least one fused instruction, representing an encoding of one or more processor-specific microinstructions, indicating an operation writing the at least one first portion and the second portion of the register.

18. A method for processing computer instructions, comprising:
- detecting a first instruction indicating an operation moving an immediate value to a register;
- detecting at least one subsequent instruction indicating an operation overwriting at least one first portion of the register and maintaining a value of a second portion of the register; and
- converting the at least one subsequent instruction into at least one fused instruction, representing an encoding of one or more processor-specific microinstructions, indicating an operation writing the at least one first portion and the second portion of the register.

19. The method of claim 18 further comprising storing the immediate value and an identifier of the register associated with the first instruction in a register write tracking table; and
- wherein detecting the at least one subsequent instruction in the instruction stream indicating the operation overwriting the at least one first portion of the register is based on the identifier of the register stored in the register write tracking table.

20. The method of claim 18 comprising detecting the first instruction and the at least one subsequent instruction fetched consecutively in an instruction stream.

21. The method of claim 19, wherein the first instruction and the at least one subsequent instruction are fetched non-consecutively in an instruction stream;
- wherein detecting the at least one subsequent instruction in the instruction stream indicating the operation overwriting the at least one first portion of the register is based on the identifier of the register stored in the register write tracking table; and
- wherein converting the at least one subsequent instruction into the at least one fused instruction is based on the immediate value stored in the register write tracking table.

22. A non-transitory computer-readable medium having stored thereon computer-executable instructions to cause a processor to implement a method comprising:
- detecting a first instruction indicating an operation moving an immediate value to a register;
- detecting at least one subsequent instruction indicating an operation overwriting at least one first portion of the register and maintaining a value of a second portion of the register; and
- converting the at least one subsequent instruction into at least one fused instruction, representing an encoding of one or more processor-specific microinstructions, indicating an operation writing the at least one first portion and the second portion of the register.

23. The non-transitory computer-readable medium of claim 22, having stored thereon the computer-executable instructions to cause the processor to implement the method further comprising storing the immediate value and an identifier of the register associated with the first instruction in a register write tracking table; and
- detecting the at least one subsequent instruction in the instruction stream indicating the operation overwriting the at least one first portion of the register based on the identifier of the register stored in the register write tracking table.

24. The non-transitory computer-readable medium of claim 22, having stored thereon the computer-executable instructions to cause the processor to implement the method comprising detecting the first instruction and the at least one subsequent instruction fetched consecutively in an instruction stream.

25. The non-transitory computer-readable medium of claim 23, having stored thereon the computer-executable instructions to cause the processor to implement the method comprising:
- detecting the first instruction and the at least one subsequent instruction fetched non-consecutively in an instruction stream;
- detecting the at least one subsequent instruction in the instruction stream indicating the operation overwriting the at least one first portion of the register based on the identifier of the register stored in the register write tracking table; and
- converting the at least one subsequent instruction into the at least one fused instruction based on the immediate value stored in the register write tracking table.

* * * * *